United States Patent
Naidu et al.

(10) Patent No.: US 9,600,072 B2
(45) Date of Patent: Mar. 21, 2017

(54) WEARABLE TACTILE DISPLAY

(71) Applicants: Prakash C R J Naidu, Ottawa (CA); Srinivasan A Mandayam, West Newton, MA (US)

(72) Inventors: Prakash C R J Naidu, Ottawa (CA); Srinivasan A Mandayam, West Newton, MA (US)

( * ) Notice: Subject to any disclaimer, the term of this patent is extended or adjusted under 35 U.S.C. 154(b) by 566 days.

(21) Appl. No.: 14/011,731

(22) Filed: Aug. 27, 2013

(65) Prior Publication Data
US 2015/0062018 A1    Mar. 5, 2015

(51) Int. Cl.
*G06F 3/01*    (2006.01)
*G06F 1/16*    (2006.01)

(52) U.S. Cl.
CPC ............. *G06F 3/016* (2013.01); *G06F 1/163* (2013.01)

(58) Field of Classification Search
CPC ....... G08B 21/003; G06F 3/016; G06F 3/041; G06F 2203/041; G06F 3/03547; G06F 3/0412; G06F 3/0414; G06F 3/0416; G06F 3/0418; G06F 3/046; G06F 3/047; H05K 9/0073; H05K 9/0079; H05K 9/0081; H05K 9/0088
USPC ............ 340/407.1, 407.2, 4.1, 4.12; 341/27; 434/114
See application file for complete search history.

(56) References Cited

U.S. PATENT DOCUMENTS

| | | | | |
|---|---|---|---|---|
| 4,758,165 A * | 7/1988 | Tieman | ................ | G09B 21/003 340/407.1 |
| 6,693,516 B1 * | 2/2004 | Hayward | ............. | G09B 21/004 340/4.12 |
| 6,985,133 B1 * | 1/2006 | Rodomista | ............... | G06F 3/016 345/156 |
| 7,106,220 B2 * | 9/2006 | Gourgey | .............. | G09B 21/005 341/27 |
| 7,245,292 B1 * | 7/2007 | Custy | ...................... | G06F 3/011 178/18.01 |
| 7,339,574 B2 * | 3/2008 | Kyung | .................... | G06F 3/016 345/163 |
| 7,410,359 B1 * | 8/2008 | Murphy | ............... | G09B 21/003 434/114 |
| 8,203,529 B2 * | 6/2012 | Rogowitz | ............... | G06F 3/016 340/407.1 |
| 2014/0071506 A1 * | 3/2014 | Han | .......................... | G03H 1/08 359/9 |

* cited by examiner

*Primary Examiner* — Joseph Feild
*Assistant Examiner* — Omar Casillashernandez

(57) ABSTRACT

A wearable tactile display device is disclosed wherein vibrating stimulation pins are located close to each other by means of underlying vibratory actuation piezoelectric bending elements arranged in a cantilever configuration partially overlapping over each other. Optionally, the plane in which the tips of stimulation pins protrude may be a curved surface providing with the ability to comply with a curved human body part such as a finger. Vibratory stimulation can be achieved at close spatial resolution by advantageously reducing the space between adjacent stimulation pins through their ability to engage with different adjacent piezoelectric cantilever bending elements when they are placed at different planes and at additional closer spatial resolution when they are placed at an angle to each other. The programmable controller employed in order to program the pattern of stimulation pin vibrations can be used for generating different amplitudes and frequencies of vibration.

6 Claims, 8 Drawing Sheets

View P
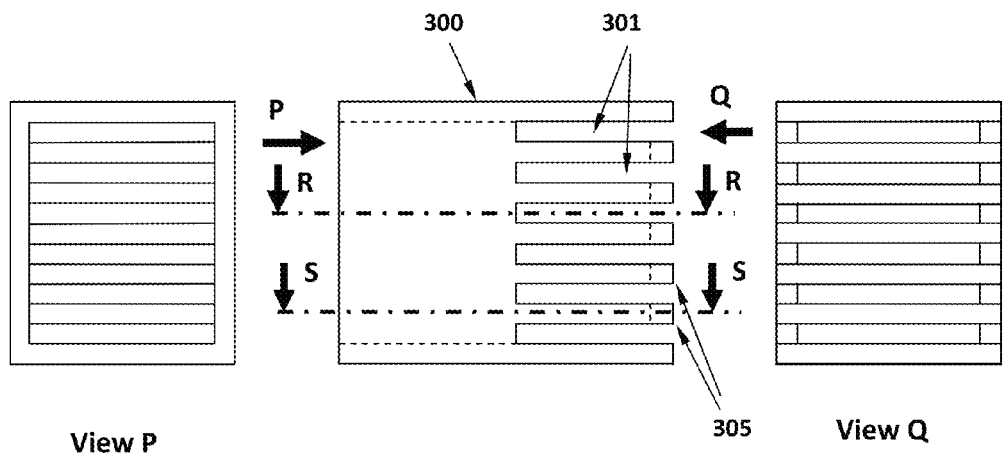
Fig. 11
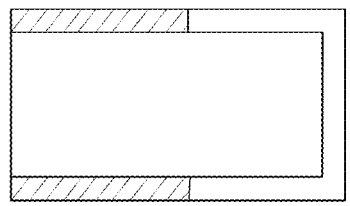
Section R-R
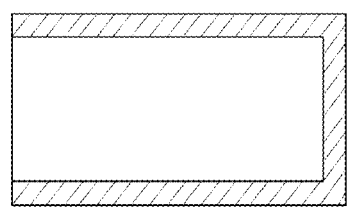
Section S-S

WEARABLE TACTILE DISPLAY

STATEMENT REGARDING FEDERALLY SPONSORED RESEARCH OR DEVELOPMENT

The work on which the disclosure of this application is based is partially funded by National Science Foundation (NSF) under the Small Business Innovation Research (SBIR) program.

RELATED U.S. PROVISIONAL PATENT APPLICATION

This application claims the benefit of U.S. Provisional Patent Application No. 61/693,507, filed 27 Aug. 2012, including all the written description of the inventions described therein and making claim to the inventions disclosed therein.

BACKGROUND OF THE INVENTION

This invention relates to tactile display device enabling tactile stimulation through vibration in human-machine interfaces such as communication of information to blind individuals and other touch based interfaces in equipments such as kiosks, mobile phones, and computer based gaming devices. Some aspects of the invention are applicable to an implementation of the invention integrating tactile display device with equipment called Talking Tactile Tablet (TTT or T3; U.S. Pat. No. 7,106,220) manufactured and offered in market by Touch Graphics Inc, NY. Further, and in addition, some aspects of the invention are applicable to another implementation of the invention integrating tactile display device with haptic equipment called Phantom® (product derived from U.S. Pat. No. 6,985,133) manufactured and offered in market by SensAble Technologies, Woburn, Mass. Other implementations of tactile stimulation including vibration for several other Human Machine Interface (HMI) purposes are also applicable.

Vibratory stimulation for use in communication such as vibration based message transmission, and human-machine interfaces such as enhanced experience during computer based gaming is a recognized need. Multi-point programmable tactile stimulation on human body can be a useful means for communication not only for persons challenged in receiving information through conventional visual or auditory means but also for general purpose applications. For example, there is emergence of vibratory tones in mobile phones to distinguish between the different callers so that the receiver of the call may identify the caller covertly without looking at the display of the mobile phone or listening to an auditory ring tone that disturbs others. In the gaming systems, there is growing need for increased sensory stimulation of different body parts of the gamers for multi-modal immersive feeling although currently the stimulation is mainly limited to vibratory joystick interfaces. In computer systems in general, tactile display that reads out information corresponding to an image visually appearing on a computer screen, and represents the image in the form of differential positions of the plurality of tactile output elements that provide a tactilely recognizable pattern representative of the information on the screen is a well identified requirement (for example, Tecu and Haas, U.S. Pat. No. 6,703,924 assigned to Hewlett-Packard Development Co, TX, wherein there is a mention of linear stepper motors as means to move plunger pins to realize the tactile display function without disclosing the detail how the required resolution, amplitude, and frequency of actuation may be achieved). Examples of these applications are found in the references in this provisional patent application, the contents of which are adopted herein in total by reference include: vibration by means of eccentric motor actuators (Yoshida et al, U.S. Pat. No. 7,157,822; Tremblay et al, U.S. Pat. No. 6,275,213), pressurized fluid actuators (Roberts et al, U.S. Pat. No. 7,352,356), dielectric elastomer actuators (Koo et al: Koo, I M, Jung, K, Koo, J C, Nam, J,-D, Lee, Y K, and Choi, H R, Development of Soft Actuator Based Wearable Tactile Display, IEEE Trans. Robot. 24, no. 3, pp. 549-558, 2008), and piezoelectric actuators (Gouzman et al, U.S. Pat. No. 5,912,660; Kyung et al, U.S. Pat. No. 7,339,574; Kyung, K,-U, and Park, J,-S, Ubi-Pen: Development of a Compact Tactile Display Module and Its Application to a Haptic Stylus, pp. 109-114, World Haptics 2007—Second Joint EuroHaptics conference and Symposium on Haptic Interfaces for Virtual Environment and Teleoperator Systems, 2007, related technology patented as U.S. Pat. No. 7,339,574; Kim et al: Kim, S,-C, Kim, C,-H, Yang, G,-H, Yang, T,-H, Han, B,-K, Kang, S,-C, Kwon, D,-S, Small and Lightweight Tactile Display (SaLT) and Its Application, pp. 69-74, World Haptics 2009—Third Joint EuroHaptics conference and Symposium on Haptic Interfaces for Virtual Environment and Teleoperator Systems, 2009).

The motor driven actuators based array systems suffer from constraints in miniaturization due to minimum size of motor and actuator elements that makes it difficult to embed them on a wearable substrate with the desirable flexibility and space resolution. The entire body of a motor and connected vibration device such as eccentric element vibrates instead of a desired specific area coming in contact with a human body.

The pressurized fluid actuators based system requires a complex grid of valves for control of actuation, again imposing difficulty in miniaturization, embedding, and achievement of close spacing.

The dielectric elastomer actuators are still in research and development, are not available in the market as a proved out product, require very high voltage through a high voltage switching circuit (3.5 kV for 0.471 mm amplitude of actuation), and moreover the center-to-center distance between adjacent stimulation points is currently about 3 mm (a grid of 20 actuator cells in a 4×5 matrix layout covers 11 mm×14 mm area) which is more than the desirable resolution as close as possible to 1 mm. The desirable resolution of 1 mm is well known in the field of tactile perception and established based on research and experiments on human perception reported as lateral two-point limen spatial resolution defining the minimal separation between two points that permits both to be perceived at a human finger tip (Biggs, J, and Srinivasan, Mass., Tangential Versus Normal Displacement of Skin: Relative Effectiveness for Producing Tactile Sensation, in 10th International Symposium on Haptic Interfaces for Virtual Environment and Teleoperator Systems. Orlando, Fla.: IEEE Computer Society, 2002; Gulati, R J and Srinivasan, M A, Human Fingerpad under Indentation I: Static and Dynamic Force Response. Hochmuth, R M, Langrana, N A, and Hefzy, M S, Bioengineering Conference, BED-Vol. 29, 261-262, 1995; Sherrick, C E, Cutaneous Communication, in Neff, W D, Ed., Contributions to Sensory Physiology, vol. 6, pp. 1-43, Academic Press, NY, 1982).

It is found that piezoelectric elements that create enough perturbation amplitude reliably and in a repeatable manner for a long duration in a field application for useful tactile stimulation are long strips required to be deposed in cantilever configuration for desired vibration near the tip. Other type of piezoelectric actuators, such as for example screw type actuators (Henderson, U.S. Pat. Nos. 6,940,209; 7,170,214; 7,309, 943; 7,339,306) appear to be having limitations in terms of frequency of vibration, tend to get stuck at the ends of the stroke of the actuator, and additionally occupy lateral space due to required screw and nut components limiting center-to-center distance between the pins vibrating for tactile stimulation (the minimum housing nut cross section dimension currently is 2.8 mm square resulting in minimum possible center-to-center distance between adjacent pins to be about 3 mm). An alternative approach adopted by Kyung et al and Kim et al using disc based actuators called Tiny Ultrasonic Linear Actuator (TULA) that replaces screw by friction between disc hole and rod also has limitations in minimum center-to-center distance between adjacent pins that can be achieved because the actuators use piezoelectric bimorph discs that are 4 mm diameter and rods that pass through the center holes through discs are 1 mm diameter. Even by staggering the discs, the center-to-center distance between adjacent pins cannot be less than 2.5 mm. Moreover, these actuators need very high frequency generation circuit (for example, TULA-35 manufactured by Piezoelectric Technology, Seoul, S. Korea operates at 128 kHz frequency) and are primarily intended for displacement actuation as a friction based actuation substitute for screw based positioning, and as such do not appear to be ideally suitable for vibratory stimulation of human body parts with desired parameters of as close as possible to 1 mm spatial resolution and 50 Hz-500 Hz temporal resolution.

Our study and analysis has revealed that although piezoelectric actuation approach has been used in Braille displays so far, the current configurations are suitable for certain applications such as identification of a contact with a surface, for example, with a push button or pin and subsequent relative sliding motion between the contact and the surface to identify an adjacent button or pin that may be 3 mm or more distance apart; but they have many limitations that are restricting progress towards the type of configuration needed for wearable tactile display. A few of these limitations are as follows. As the piezoelectric actuators have very small amplitude of vibration, typically in the range of a few micro millimeters, they can be felt well desirably at frequency range 50 Hz to 500 Hz (the temporal resolution range for human perception is 0-1000 Hz as per the references cited in the context of spatial resolution in an earlier paragraph). The voltage requirements are ideally 100V and above, although there are attempts to use the actuators at lower voltages such as 25-30V with compromised lower displacement that is difficult to perceive. This is the main reason why the current devices use cantilever configuration to enhance the displacement to desirable amplitude in the range of 0.050 mm to about 1 mm. It is possible to accommodate the cantilever configuration if the communication of information is by numerous Braille cells and the finger slides over those cells as is the prevailing practice while reading cells in Braille Displays (for example, Brailliant Braille Displays manufactured and offered in North American market by Humanware Inc, Longueuil, QC, Canada). In such a configuration, center-to-center distance between adjacent pins is not required to be minimized and typically this distance is more than 3 mm. However, if we want to attach a cell on the finger and convey all the information through programmable actuation of the pins as required in wearable tactile display, a different configuration is required that has the potential to pack a higher density of actuators on a small footprint and lean package size with desired parameters of as close as possible to 1 mm spatial resolution and 50 Hz-500 Hz temporal resolution. It is also desirable that the voltage requirement is reduced to around 25-30V.

Aspects of the present invention overcome some of the difficulties in prior art either individually or in combination with each other. The advantages of the present invention will become apparent from the description and accompanying drawings.

BRIEF SUMMARY OF THE INVENTION

A wearable tactile display device is disclosed wherein two or more vibrating stimulation pins can be located close to each other in one plane by means of the underlying vibratory actuation piezoelectric bending elements arranged in a cantilever configuration partially overlapping over each other as another set of planes. Preferably, the planes in which piezoelectric elements are placed that overlap may be substantially parallel to the plane in which tips of said pins protrude. Further, preferably, but optionally and in addition, the plane in which the tips protrude may be a curved surface providing with the ability to comply with a curved human body part such as a finger, and parameters of stimulation of individual elements in the array may be controlled in a programmable manner. According to an aspect of the invention, vibratory stimulation can be achieved at close spatial resolution by advantageously reducing the space between adjacent stimulation pins through their ability to engage with different adjacent piezoelectric cantilever bending elements when they are placed at different planes. According to another aspect of the invention, vibratory stimulation can be achieved at additional closer spatial resolution by advantageously using the geometrical space between adjacent piezoelectric cantilever bending elements when they are placed at an angle to each other. The programmable controller employed in order to program the pattern of stimulation pin vibrations can be advantageously used for generating different amplitudes and frequencies of vibration.

According to one specific application of the invention illustrated in FIG. 10B, the wearable tactile display 10 is attached to a blind person's human finger 20 such that an array of pins is in contact with the finger. The mouse type block of wearable tactile display 10 may be moved easily over a Tablet type surface 30 to enable tactile reading of the information to be conveyed depending on the location of the block on the Tablet. The vibratory actuation pattern of the pins can then convey the information otherwise conveyed by physical protrusion by means such as ridges of an embossed paper normally used in such tablets while a related audio commentary is provided through a computer 40 attached to the tablet. This enables software based programming of information such as maps 45 for education and navigation needs of blind individuals, substituting embossed paper based means that are inflexible, difficult to transport, and expensive.

According to another specific application illustrated in FIG. 10C, the single point force feedback capability of haptic devices 70 such as Phantom® can be augmented by multi-point wearable tactile display 10 attached on the thimble 60 of haptic devices enabling realistic perception and feeling of 3D models 46 of virtual objects in computer 40. Many other applications in the fields of Human-Machine Interfaces are also possible; for example: (a) Mobility and Education Aid for people who are visually impaired or blind; (b) Better and easier interaction at Kiosks; (c) Improved and novel infotainment systems interfaces; (d) Improved video gaming experience for mobile, residential stand-alone, residential online, and arcade gaming at Family Entertainment Centers (FECs); (e) Improved and varied communication through mobile devices such as mobile phones; (f) Improved haptic manipulation enhanced with tactile displays embedded in current haptic devices.

BRIEF DESCRIPTION OF THE SEVERAL VIEWS OF THE DRAWING

FIG. 10 B illustrates an example method of use of wearable tactile display for tactile reading of maps by blind individuals in conjunction with a tablet device on the surface of which the tactile display block is slided like a mouse by the finger attached to it. FIG. 10 C shows an example method of augmentation for multi-point perception of 3 D models of virtual objects in computer by attaching the wearable tactile display on the thimble (a ring shaped receptor provision at the tip of last link of a haptic device, typically provided to attach human finger to the haptic device) of single-point force feedback capability haptic devices.

FIG. 11 shows detailed structure of integrated holder of piezoelectric elements including end view P, end view Q, a sectional view R-R and another sectional view S-S.

DETAILED DESCRIPTION OF THE INVENTION

Figure 1:
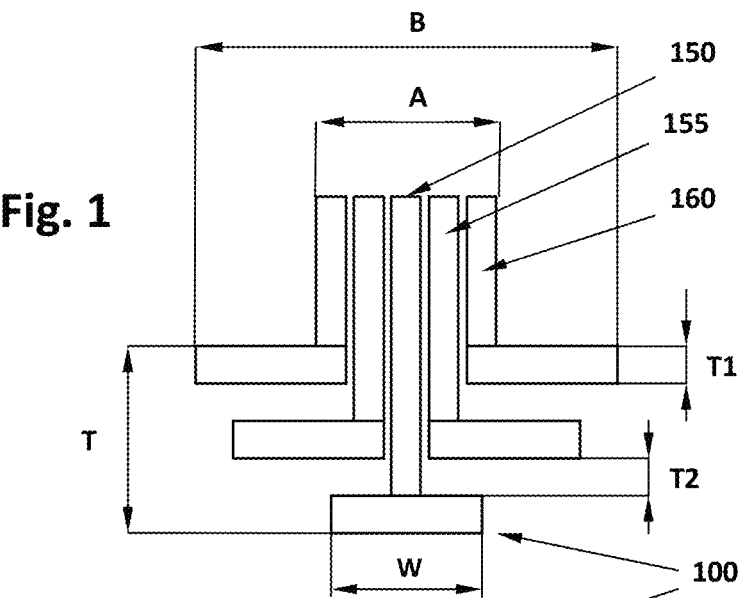
FIG. 1 shows front elevation view of an embodiment of the invention wherein a set of piezoelectric actuators are placed in an overlapping arrangement providing for close placement of vibration stimulation pins in one row.
Figure 2:
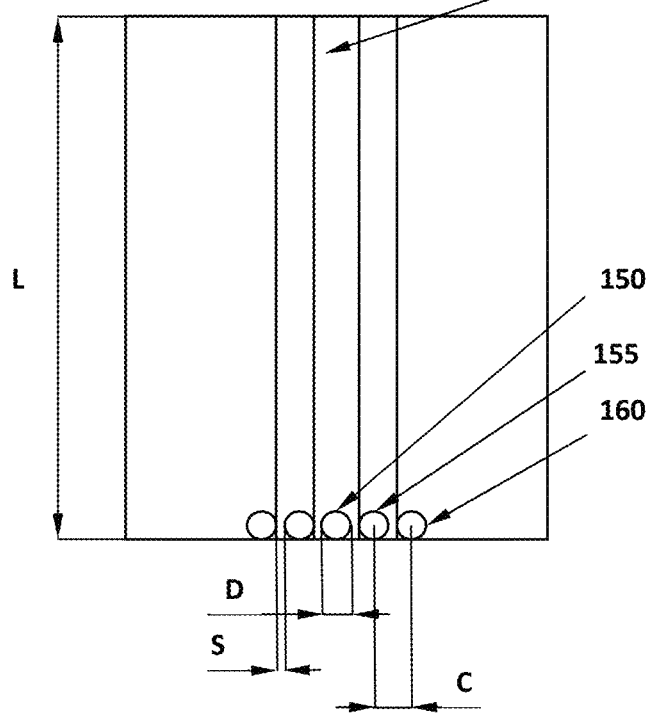
FIG. 2 shows top view of the arrangement of piezoelectric actuators and pins in the embodiment of FIG. 1.

An embodiment of the invention is illustrated in FIG. 1 wherein a piezoelectric element 100 is placed at the bottom of a stack of similar overlapping piezoelectric elements arranged at different planes one over another. The piezoelectric element used in the embodiment is W wide measuring 3.2 mm (0.125 inch), has thickness T1 measuring 0.51 mm (0.02 inch), and length L measuring 31.8 mm (1.25 inch) and is manufactured by Piezo Systems Inc, Woburn, Mass. Other sizes and/or makes may be used. The Figure is a front elevation view as seen from the end side of the stack where the cantilever piezoelectric elements are free to move in vibratory motion in a direction up and down normal to the planes in which the elements are laying. In the illustrated configuration, one piezoelectric element is at the bottom of the stack with a vibratory stimulation pin 150 placed very close to the tip of the element as can be seen in the top view of the arrangement depicted in FIG. 2. The pin shown is cylindrical in shape but can be of other shapes. The pin in the developed embodiment is 0.8 mm in diameter D but can be smaller or bigger as may be required in an application. The embodiment shown has two more piezoelectric elements identical to the element at the bottom at a distance T2 from the bottom element placed in a second plane. These elements may be located at very close proximity to the pin 150. In the embodiment shown, this space S is 0.1 mm but can be smaller or larger as may be required in a particular application. Another set of pins 155 that are shorter in length than the pins 150 are placed at the edges of the piezoelectric elements, resulting in three pins in a row placed as close as 0.1 mm from each other having the top tips at a single plane facilitating vibration stimulation to a body part that may be in contact with the top tips of the pins when they are actuated by the respective piezoelectric elements on which the pins are placed. The FIGS. 1 and 2 further show yet another set of piezoelectric elements in a third plane with an additional set of pins 160 that are shorter in length than the pins 150 and 155 and are placed at the edges of the piezoelectric elements, resulting in five pins in a row placed as close as 0.1 mm from each other having the top tips at a single plane facilitating vibration stimulation to a body part that may be in contact with the top tips of the pins when they are actuated by the respective piezoelectric elements on which the pins are placed. This manner of stacking of piezoelectric elements and pins may be continued to multiple layers of levels as may be required for an application. The FIGS. 1 and 2 show a set of 5 piezoelectric elements and 5 pins stacked, however, those skilled in the art may appreciate that it can be any number, for example 2, 3, 4, 5, 6, . . . 10, or even 100 depending on the needs of an application.

A feature of the embodiment described in the paragraph above is that a very close pin resolution has been achieved with very compact packing of the placement of parts such as piezoelectric elements and vibratory stimulation pins. To illustrate by way of example, the center-to-center distance C between any two adjacent stimulation pins in the disclosed embodiment is (D+S) which equals to 0.9 mm (0.8+0.1 mm). The thickness T of the arrangement of 3 layers of piezoelectric elements stack is (T1*3+T2*2) which equals to 2.55 mm (0.51*3+0.51*2 mm). The width A of the 1×5 array of tactile stimulation pins having 5 columns is (D*5+S*4) which equals to 4.4 mm (0.8*5+0.1*4). The width B of the stack of piezoelectric elements providing for 1×5 array of tactile stimulation pins having 5 columns is (W*2+D*3+S*4) which equals to 9.2 mm (3.2*2+0.8*3+0.1*4). It may be appreciated by those skilled in the art that the dimensions mentioned in the description are only by way of example to clarify and illustrate the detailed configuration of a preferred embodiment in the context of particular sample parts used to build the embodiment and in no way limits the scope of the invention that includes several other possibilities with numerous combinations of arrangements of piezoelectric elements and stimulation pins, their sizes and dimensions, and therefore the disclosed invention covers and includes all such possibilities that may fall within the spirit of the disclosed invention.

Figure 3:
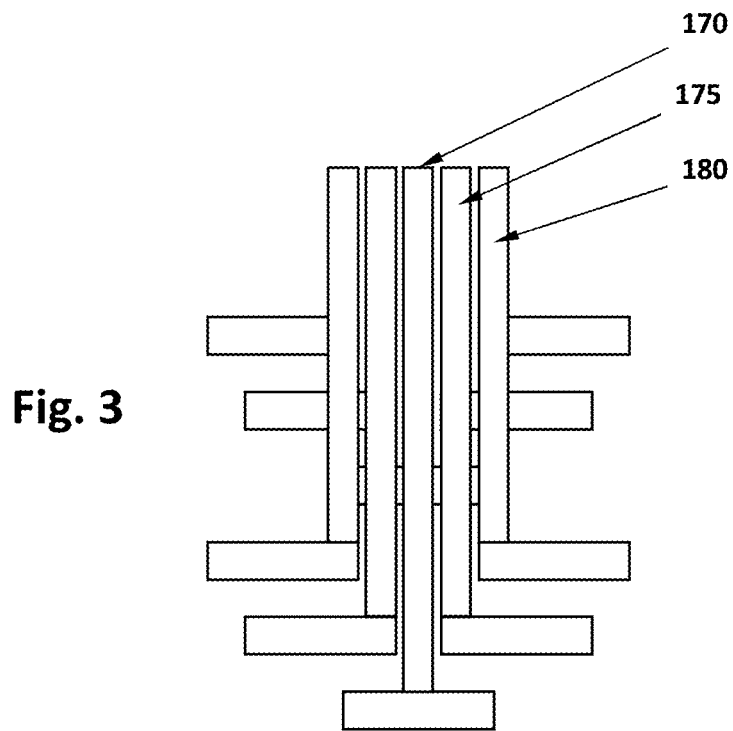
FIG. 3 shows front elevation view of another version of the embodiment wherein a second set of piezoelectric actuators are placed in an overlapping but offset arrangement providing for close placement of vibration stimulation pins in two rows.
Figure 4:
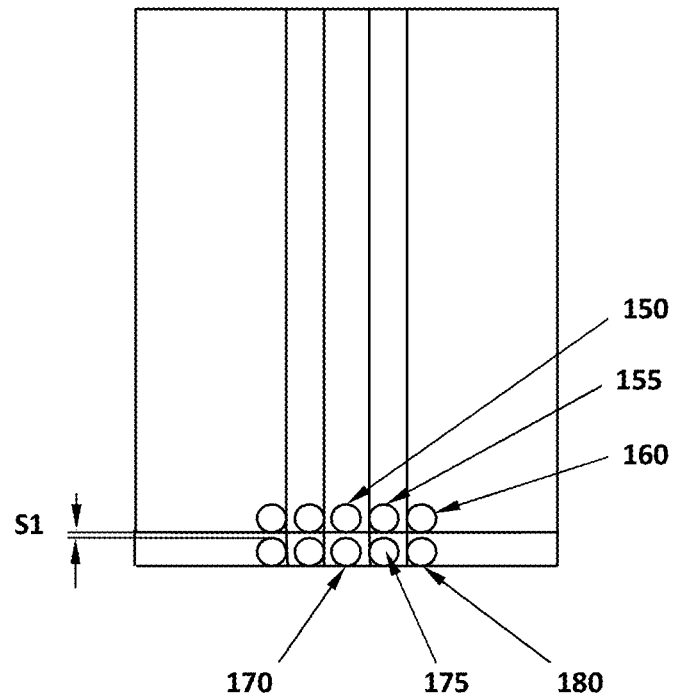
FIG. 4 shows top view of the arrangement of piezoelectric actuators and pins in the embodiment of FIG. 3.

FIGS. 3 and 4 illustrate the front elevation and top view respectively of an extended stack of the arrangement described in the preceding paragraphs wherein two different stack sub-assemblies may be arranged one over other with staggered offset in a direction substantially perpendicular to the direction in which the piezoelectric elements were staggered within each of the stacks described earlier. While the width, length, and thickness of the constituent stacks may be identical (in this case illustrated they are B wide, T thick, and L long each), the stimulation pins 170, 175, and 180 used in the stack at a lower level are relatively longer compared to the stimulation pins 150, 155, and 160 used in the stack at a higher level. The pins in one row are at a gap of S1 space from the other row. The space S1 can again be very small, for example, it can be 0.1 mm similar to the space S between adjacent pins in each row. This arrangement provides for a 2×5 array of tactile stimulation pins having 2 rows and 5 columns with spatial resolution center-to-center distance between adjacent pins in two directions perpendicular to each other as 0.9 mm or other resolutions that may be smaller or larger as may be required in a particular application.

Figure 5:
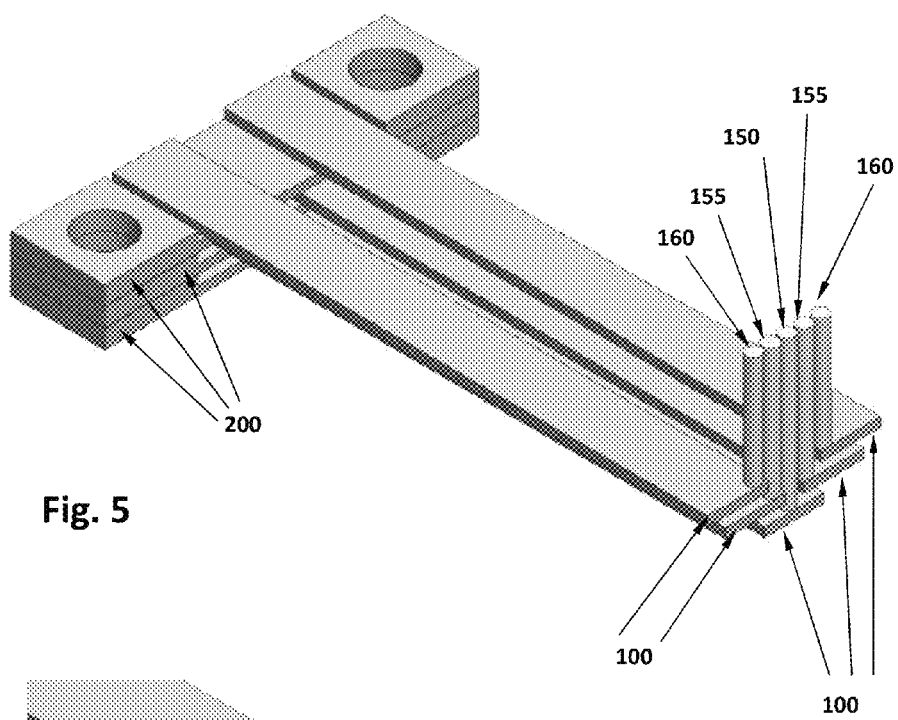
FIG. 5 shows a perspective view of the arrangement of piezoelectric actuators and pins in the embodiment of FIGS. 1 and 2.
Figure 6:
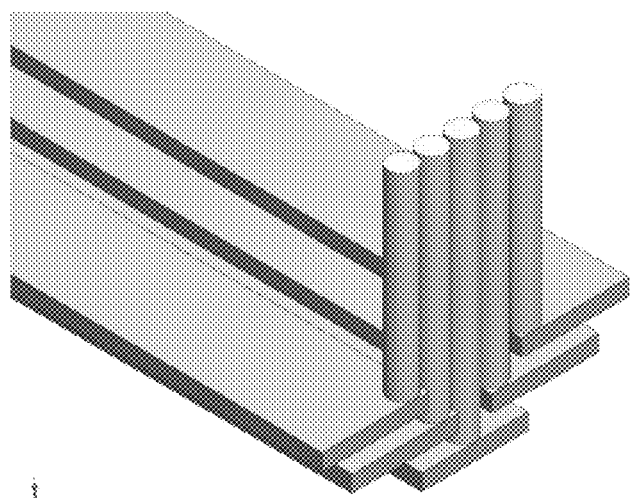
FIG. 6 shows a close up view of the placement of pins on piezoelectric actuators in the embodiment of FIGS. 1 and 2.
Figure 7:
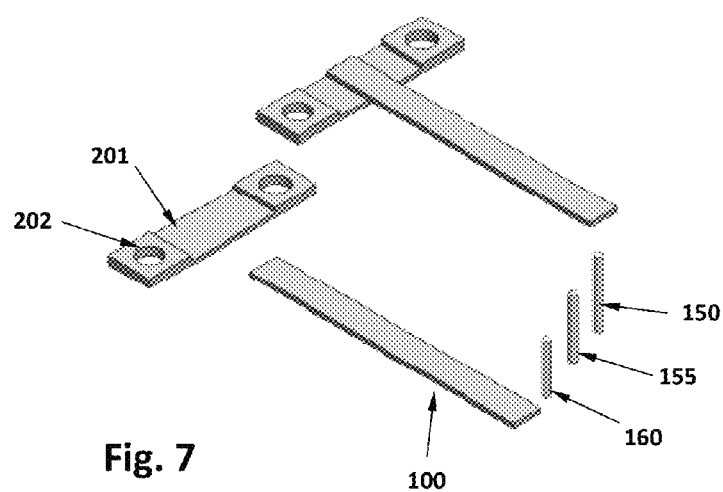
FIG. 7 shows an exploded view of the major parts in the assembly of the embodiment along with a partially assembled view of the embodiment of FIGS. 1 and 2.
Figure 8:
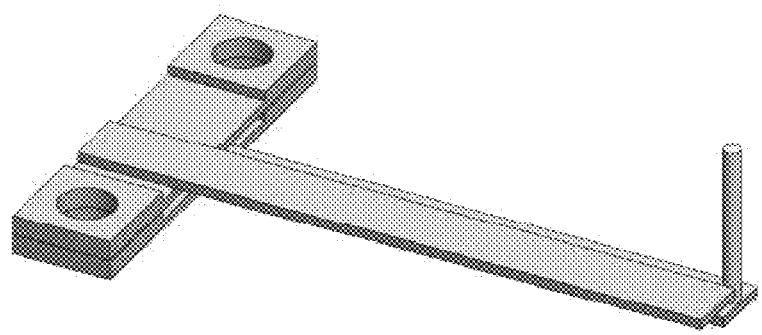
FIG. 8 shows a perspective view of partially assembled embodiment of FIG. 1 and FIG. 2.

An overall perspective view of the assembly of a stack of five piezoelectric elements and five stimulation pins along with one possible configuration of three holders 200 that may be used to retain piezoelectric elements at the fixed end of a stack, is illustrated in FIG. 5. A close up view of the stack arrangement is shown in FIG. 6. An exploded view shown in FIG. 7 illustrates samples of the parts used in a stack assembly, namely, piezoelectric element 100, stimulation pins 150, 155, and 160, and holder 200. The figure also shows a typical placement of a piezoelectric element on a holder. The engagement between the holders and the piezoelectric elements may be by different alternate means, for example by adhesive, by screws, or by retaining of the piezoelectric element as a sandwiched part clamped between two holders. For example, as shown in FIG. 7, there may be a recess 201 on the holder 200 whose depth is slightly less than the thickness of the piezoelectric element 100. By fastening holders 200 together retaining the piezoelectric elements 100 placed in the recess 201 in-between adjacent holders using screws (not shown in figures) in the screw holes 202 and suitable nut elements (not shown in figures), the piezoelectric elements can be clamped in positions relative to each other as shown in FIGS. 5 and 6. Those skilled in the art may appreciate that there can be several ways and means by which the piezoelectric elements may be fixed at one end to facilitate the arrangement of stack of elements as disclosed in this application, and therefore the disclosed invention covers and includes all such possibilities that may fall within the spirit of the disclosed invention. FIG. 8 depicts another stage of the progressive assembly of the stack in which two piezoelectric elements, two holders, and one pin are arranged.

Figure 9:
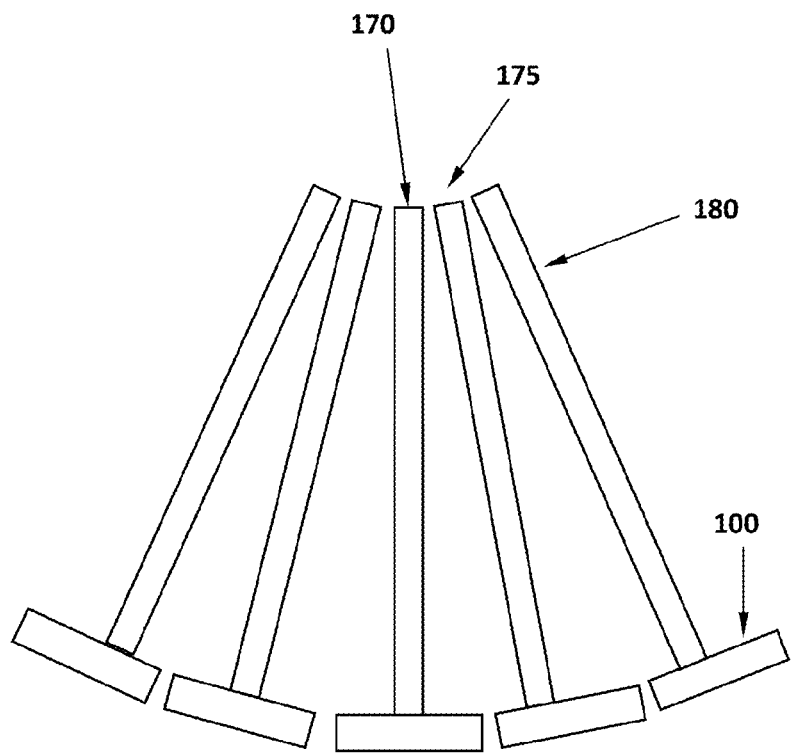
FIG. 9 shows a configuration wherein the tips of stimulation pins are placed on a circular plane compliant with a curved shape of a human body part such as a finger or a wrist.

An additional, but optional embodiment of the disclosed invention may have flexibility in the holder providing for piezoelectric elements within a plane to be placed at an angle to each other. This aspect of the invention has additional advantages. For example, the tips of stimulation pins can be placed on a circular plane compliant with a curved shape of a human body part such as a finger or a wrist. By this arrangement, it is also possible to place adjacent piezoelectric elements relatively distant from each other (for example at 3 mm gap from each other) but at the same time achieve placement of the tips of the stimulation pins at very close resolution (for example at 0.1 mm gap from each other). This aspect of the invention is illustrated in FIG. 9.

Figure 10:
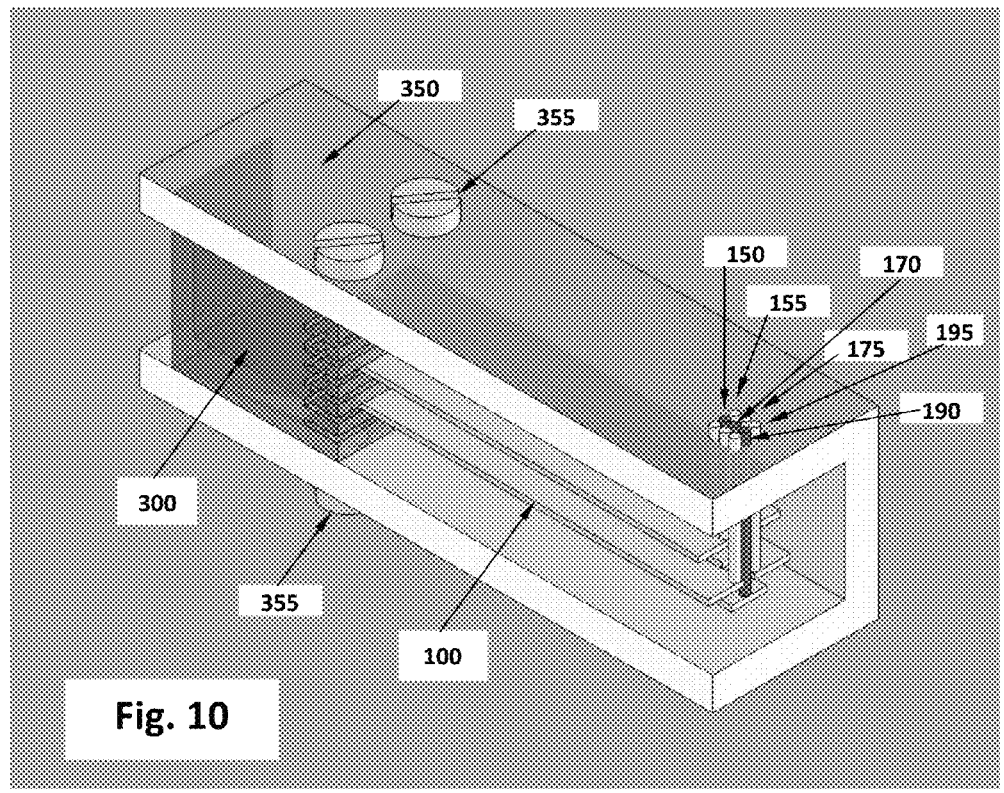
FIG. 10 shows a perspective view of an assembled embodiment having an integrated holder of piezoelectric elements placed inside housing with micro-holes from which stimulation pins are protruding. This representative assembled embodiment of wearable tactile display is further elucidated for its internal structure in FIG. 10 A, and application examples in FIG. 10 B and FIG. 10 C.
Figure 10A:
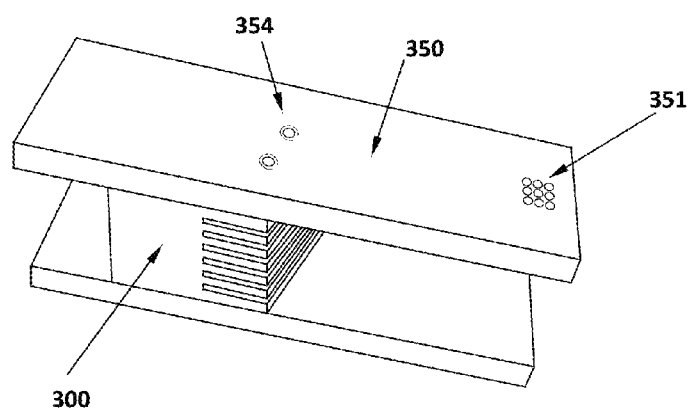
FIG. 10A shows a partially assembled view of the embodiment of FIG. 10 without the stimulation pins, piezoelectric elements and clamping screws; illustrating the tapped holes and micro-holes on the housing.
Figure 10B:
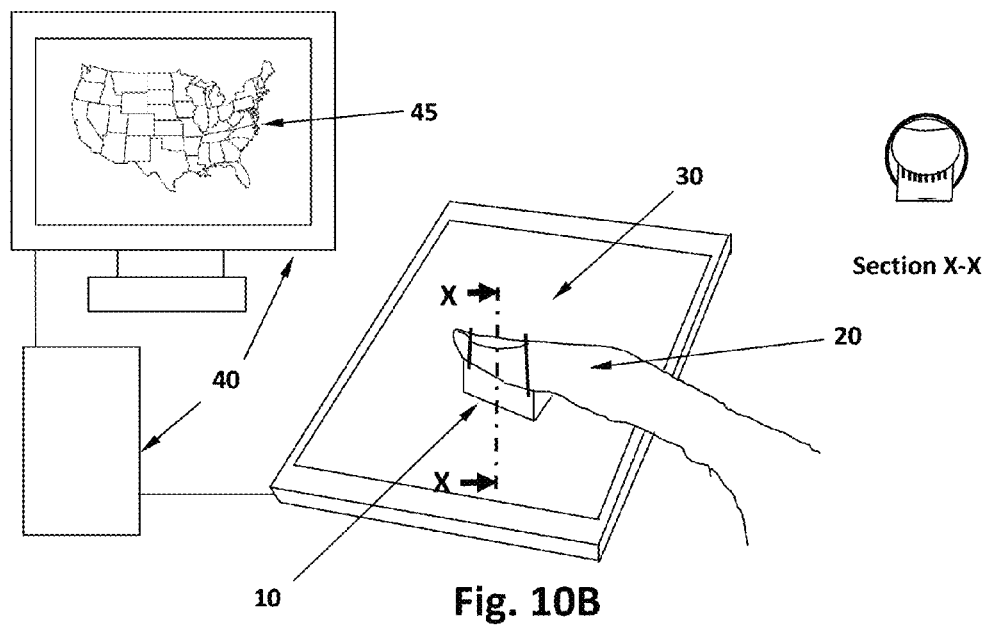
Figure 10C:
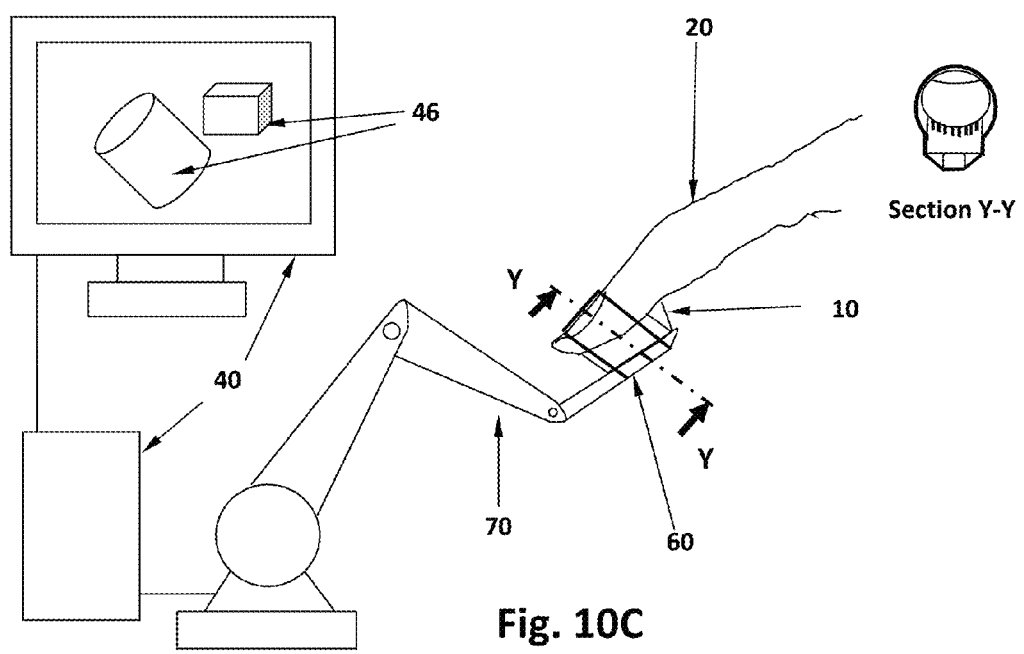

Courting yet another additional, but optional embodiment of the disclosed invention, an integrated actuator holder embodiment is disclosed wherein the width of the assembly may be reduced by dispensing with the need for screw holes 202. While the stacked actuator holder approach has potential for low cost automated production of holder elements by stamping process, it was found that due to the requirement for clamping screws to be on the sides of the piezo stack, the width of the assembly was close to 30 mm in a prototype embodiment. With a view to reduce this to below 20 mm for convenient attachment to a human finger or a Phantom™ haptic device thimble, an alternate integrated approach was configured which is being disclosed as follows. An additional embodiment was developed as per FIG. 10, comprising of an integrated holder 300, a housing 350, piezoelectric elements 100, and stimulation pins 150, 155, 170, 175, 190, 195. The integrated holder 300 clamps the piezoelectric elements 100 in desired positions relative to each other by tightening of screws 355. The implementation of this design required Electro Discharge Machining (EDM) including Wire Cut EDM and spark erosion through custom built electrode. The sample integrated holder 300 has a set of six 0.5 mm wide slits 301 (FIG. 12) manufactured using these techniques for production, with a capacity to hold 9 piezoelectric elements 100 (FIGS. 10 and 11). The sample housing 350 has a set of 9 micro holes 351 with 0.9 mm center-to-center distance (FIG. 11) accommodating the 9 stimulation pins 150 (quantity 1), 155 (quantity 2, on two sides of 150), 170 (quantity 1 at the middle), 175 (quantity 2, on two sides of 170), 190 (quantity 1 at the middle), 195 (quantity 2, on two sides of 190). The diameter of micro holes in the sample housing is 0.8 mm to 0.81 mm enabling them to guide 0.8 mm diameter (with ISO h7 or any other tolerance enabling sliding fit with the micro holes) stimulation pins. Those skilled in the art can appreciate that there can be several other sizes, fits and tolerances that can function to enable guidance of stimulation pins while they are vibrated by the respective piezoelectric actuators on which the pins rest.

In one of the many possible configurations of the sample integrated holder as shown in FIG. 12, the holder body maybe made of spring material such as spring steel, and maybe hollow to enable squeezing of the rectangular shaped clamping beams 305 closer to each other resulting in clamping of the piezoelectric elements retained in the slit 301 between adjacent clamping beams. The squeezing force is exerted by tightening of screws 355 (FIG. 10) by rotating them inside tapped holes 354 (FIG. 11) in the body of housing 350 that results in linear advancement of the screws effecting squeezing of the rectangular shaped clamping beams 305 closer to each other. Those skilled in the art may appreciate that the integrated holder may be made of different other materials like Teflon, hard rubber, or other materials with different production techniques such as molding; and all the variants are covered under the spirit and scope of the disclosed invention.

The overall size of the improved production version achieved to date is 18 mm height, 15 mm width, and 52 mm length; the steel version weighing about 60 grams, ideal to be attached below an average sized index finger by using Velcro™ straps. The disclosed configuration is tested for required perception with field application trials. Furthermore, additional configurations have been tested with larger width (10 mm) piezoelectric actuators (for example, Cofired Multilayer Piezo Bender, model PAB-4010, make Micro-mechatronics Inc, College Park, Pa.) resulting in higher perception levels, maintaining sub-millimeter center-to-center stimulation pin distance resolutions.

An important result achieved by the disclosed invention is that resolution of tactile perception has been decoupled from the size of the actuator. The novel arrangement of layout of the actuator elements enables larger actuators to be used and still achieve sub-millimeter resolution. This has opened up new avenues to obtain higher intensity of vibratory perception while achieving smaller resolutions that were not possible in the state-of-the-art.

Programmable patterns of tactile stimulation can be achieved by the disclosed embodiments or their variants. Different amplitudes and frequencies of vibration may be generated by advantageously using the programmable controller employed in order to program the pattern of vibration of the pins. Voltages in the range of 10V-30V are generally suitable for perceptible vibration stimulation depending on the size of piezoelectric actuator and amplitudes of vibration in the range of 50 to 500 micro millimeters as may be desired for different applications. For example, in one of the specific embodiments described, piezoelectric element model T220-A4SS-103Y (Piezo Systems Inc, Woburn, Mass.) of the size 0.51 mm thickness, 3.2 mm width, and 31.8 mm length is found to provide ±27 micro millimeters amplitude of vibration to the stimulation pin placed at the tip of the free end of the element when wired for parallel operation using 12 Volts power (Vp). Several versions of theses embodiments are feasible.

The tactile stimulation pins are guided and held by a cover or other means with or without holes through which the pins may pass, allowing for transmission of the vibrations of the pins to the part of body coming in contact with the pins (not shown in the figures). A housing may retain the stack sub-assemblies and one or several of them may be attached to flexible strap or belt members on one or more sides. These belt members have means at the loose open ends to attach to each other as a joint. The joint may be a Velcro™ or can be any other means of joining such as a buckle, hook, or clamp. The lengths of flexible members are provided suitable to the body part where the wearable tactile display is to be attached. As a standard, the lengths are suitable for attaching the wearable tactile display around a human finger, wrist, arm or leg. Optionally, there is provision to extend the length of the flexible members by fixing extension straps to enable the wearable tactile display to be attached around other body parts such as hips, abdomen, waist, chest, back, neck, and forehead. The tactile stimulation may also optionally be distributed into different groups of subassemblies with independent attachment means to enable application to different body parts simultaneously.

The power cables are bunched together (not shown in the Fig.) and taken away from the wearable tactile display unit preferably at a direction parallel to the contact surface between the wearable tactile display and the human body part (but it can be any angle between 0 degrees to 90 degrees) as it is found to be most suitable to conveniently attach the wearable tactile display with the human body part in many instances. The cables are clamped by suitable means to avoid stress at their joints with the piezoelectric elements enabling increased durability.

The disposition of mounting of piezoelectric elements and the placements of pins shown in embodiments of FIGS. 1 to 8 are only examples of several possibilities that may be readily conceived by those skilled in the art by developing equivalents, variants, and alterations that fall within the scope and spirit of the present disclosure. The embodiments of overall system configuration depicted in the figures consist of wearable tactile displays with an array of pixels configured as illustrated by way of example as a 1×5 matrix of 5 stimulation pins in single stack with only one row and 2×5 matrix of 10 stimulation pins in 2 rows. However, there can be any combinations of the number of rows and columns and thus the number of stimulation points in each row and column.

Furthermore, the disposition of mounting of piezoelectric elements and the placements of pins shown in embodiments of FIGS. 10 to 12 using integrated holder and housing are only examples of several possibilities that may be readily conceived by those skilled in the art by developing equivalents, variants, and alterations that fall within the scope and spirit of the present disclosure. The embodiments of overall system configuration depicted in the figures consist of wearable tactile displays with an array of pixels configured as illustrated by way of example as a 3×3 matrix of 9 stimulation pins placed over a staggered arrangement of 9 piezoelectric actuator elements held in single integrated holder having 6 slits. While each row comprises of a 1×3 matrix of 3 stimulation pins using 2 adjacent slits in the holder, 3 such rows staggered in the longitudinal direction results in the 3×3 matrix. However, there can be any combinations of the number of rows and columns and thus the number of stimulation points in each row and column.

The wearable tactile display unit is connected to a tactile display control circuit, Data Acquisition (DAQ) sub-system and engaged in communication through signal and power transmission including required amplification and modulation to enable generation of a pattern of different vibration stimulation points on the wearable tactile display in a programmable and controllable manner. This controller subsystem is interfaced optionally with a computer having Microsoft Microsoft® Windows® Platform and NI™ Labview™ Graphical Engine and Logic (National Instruments, Austin, Tex., USA) for the Graphical User Interface if required in an application such as integration with a Talking Tactile Tablet or integration with a haptic system for augmentation. A computer may be connected with user input devices, namely, a mouse, joystick, keyboard, or other input means. The computer may also be connected with a display unit such as a conventional raster scan monitor or LCD display. In an embodiment of wearable tactile display control, the strength and frequency of the input power to the piezoelectric elements is controlled by a Data Acquisition (DAQ) card, amplifier, and a power supply. The control is open loop and the set vibration stimulation characteristics of a particular pin are achieved based on the programmed input. USB compatible DAQ module NI 6210 (National Instruments, Austin, Tex., USA), other cards such as cards built from components or available off-the-shelf of other makes, models, and sources may also be used. The wearable tactile display control described by way of example is only one of several possibilities that may be readily conceived by those skilled in the art by developing equivalents, variants, and alterations that fall within the scope and spirit of the present disclosure. For example, to reverse direction of vibration in a cyclic manner, a H-bridge may be employed in the circuit (for example, Dual H Bridge Driver Model No. NJM 2670, NJR Corp, San Jose, Calif., USA) or a combination of Darlington transistors (for example, TIP 122 and TIP 127 from Fairchild Semiconductor, Irving, Tex., USA)

and alternatively or optionally an Operational Amplifier (for example, LT1210 CT7 from Linear Technology, Milpitas, Calif., USA) may be employed in the circuit. It may also be appreciated by those skilled in the art that the control circuit can be operated through a microprocessor, a Field Programmable Gate Array (FPGA), or a System on Chip (SOC) such as a PC 104 Controller.

We claim:

1. A wearable tactile display device comprising:
   an array of pins having at least three pins forming a layout such that all the pins are not placed in a straight line but instead as a matrix of rows and columns providing a stimulus for stimulating a human user in at least a row and a column;
   a means for the pins to be held either parallel or at an angle to each other while moving along their axes;
   a means to move the pins along their axes independent of each other by movement of cantilever actuators on which the said pins are placed or with which the said pins are in contact;
   a means to achieve close spatial resolution between adjacent pins in at least a row and a column layout simultaneously by either (a) placement of actuators in different planes enabling partial overlapping over each other in one direction and at the same time staggering of the location of the tips of some of the actuators in another direction or (b) placement of the actuators at planes making angles with each other enabling tips of the pins to be placed close to each other in a row and at the same time staggering of the location of the tips of some of the actuators enabling tips of the pins to be placed close to each other in a column;
   a means to hold the actuators;
   a means to enable programmable control of each of the actuators in the rows as well as the columns simultaneously with different individual amplitudes forming 3D pattern of shapes at the tips of the pins that can be felt by a body part of the human user without the need for embossed paper or other physical overlay;
   wherein the wearable tactile display is configured to be attached to said human body part such that the array of pins is in contact with the human body part and to be moved over a tablet surface;
   wherein different patterns of pins convey information to said human by said different patterns of stimulation depending on the location of the wearable tactile display over the tablet surface.

2. A wearable tactile display device of claim 1 wherein the actuator is a cantilever strip type piezoelectric bending element.

3. A wearable tactile display device of claim 1 wherein the plane in which the tips of stimulating pins protrude is a curved plane providing for ability to comply with a curved human body part.

4. A wearable tactile display device of claim 1 wherein the movement of a stimulating pin is a vibration motion.

5. A wearable tactile display device of claim 4 wherein the vibration motion of a pin is of different amplitude or different frequency or both different amplitude and frequency compared to vibration motion of another pin.

6. The wearable tactile display of claim 1, wherein audio commentary is provided by a computing device attached to the tablet.

* * * * *